United States Patent Office 3,748,227
Patented July 24, 1973

3,748,227
CONTAINMENT SYSTEM FOR A SODIUM COOLED REACTOR
Heinz Hillekum, Cologne-Dellbruck, and Ludwig Lange, Bensberg-Refrath, Germany, assignors to Interatom Internationale Atomreaktorbau GmbH, Bensberg, near Cologne, Germany
Filed Oct. 21, 1971, Ser. No. 191,403
Claims priority, application Germany, Oct. 24, 1970, P 20 52 335.7
Int. Cl. G21c 9/00
U.S. Cl. 176—38      12 Claims

ABSTRACT OF THE DISCLOSURE

A containment system is provided for a sodium cooled reactor having a heat removal system for removing heat energy generated in the reactor during normal operation, wherein the containment system limits the effects of a Bethe-Tait excursion and heat energy released thereby and prevents the transmission of dangerous radiation to the environment in the event of an accident in the reactor. The containment system has three mutually telescoped containment shells of concrete surrounding the reactor, the shells being formed respectively of flat rectangular walls and a flat rectangular ceiling. A pressure relief compartment is disposed within the innermost of the shells and a heat sink is located in the compartment and having a heat absorbing capacity adequate for absorbing the heat energy released by the reactor in the event of an accident therein as well as for absorbing the heat energy present during a simultaneous failure of the heat removal system. The innermost shell is resistant to pressure and is at least partially penetrable by gas.

---

The present invention relates to a containment system for limiting the consequences of a Bethe-Tait excursion as well as for protecting the environment from radiation danger in case of an accident in a sodium cooled nuclear reactor.

Containment systems generally consist of several pressure-proof and gas-tight vessels, at least one of which is manufactured to comply with severe requirements as to gas-tightness to avoid the escape of radioactive gases. The so-called safety containments of conventional configuration are intended to withstand the maximum pressure likely to arise in case of an accident on the one hand, and to be gas-tight as far as possible on the other hand. With regard to strength and weight, they are of cylindrical and/or spherical shape and are made either entirely of steel or of concrete covered with a thin but tight layer of steel. The necessary increase in power output of the plants newly built requires, in the case of the conventional cylindrical and/or spherical containments, a thickness of wall and diameters that can no longer be achieved economically. The configuration of these containments is based on hypothetical accidents that can presumably be disregarded in the future and which therefore are probably of no importance for the further development of large nuclear power plants.

It is known in the case of water-cooled power reactors to store large quantities of water or even ice within the containment so that part of the steam escaping during a breakdown is condensed thereby reducing the pressure. U.S. Pat. No. 3,453,176 teaches the use of masses of stone as a heat storage means which is, however, cooled by water sprayed thereon by nozzles. Such heat storage devices are, however, not permissible for sodium cooled reactors because of the violent chemical reaction between sodium and water. Apart from this, the consequences of an accident of water-cooled power reactors are quite different from those of sodium-cooled reactors. Because of the higher boiling-point of sodium, working pressures can be much lower and also the energy liberated is considerably less if the chemical reaction between the sodium and water or atmospheric oxygen can be precluded. The disadvantages of the large cylindrical and/or spherical containments, apart from cost, are the difficulty of testing for tightness, the necessity of allowing for thermal expansion between a gas-tight steel skin and a concrete vessel and their sensitivity to external accidents, for example, to an airplane crash.

The objects of the invention are to obviate the disadvantages of the large cylindrical and/or spherical safety containments, and to limit the consequences of a Bethe-Tait excursion to avoid radiological dangers to the environment in the case of an accident of a sodium-cooled nuclear reactor.

The containment system of the invention includes three vessels or shells built of concrete, namely: the inner containment, the outer containment and the reactor building enclosing the inner and outer containments. The inner containment is filled with an inert gas.

According to a feature of the invention, all three vessels of the containment system are assembled or can be assembled or can be assembled essentially of walls and ceilings that are rectangular and flat. According to another feature of the invention, there is a pressure relief room with a heat sink in the inner containment. The functioning of the pressure relief room and heat sink are not impaired in case of a failure by the interruption of any pipes in the normal heat removing system. The inner containment is made pressure-proof, but not extremely gas-tight, that is, it is penetrable to some extent by gas. The heat sink can handle a considerable part of the heat energy liberated from the reactor core in a serious accident, thereby limiting the maximum possible pressure in the inner containment. The heat sink has a heat absorbing capacity to also absorb the heat energy present during a simultaneous failure of the heat removal system which removes heat energy generated in the reactor during normal operation. By making the inner containment completely inert, sodium fires in the case of pipe or vessel ruptures are prevented and also the maximum possible pressure occurring because of the accident is limited. By dispensing with an active cooling of the heat sink from outside the inner containment, effective also in case of a break-down, safety is enhanced. The larger spaces and masses necessitated by this are still smaller than those required by the conventional cylindrical and/or spherical safety containments.

In order to make possible a rapid temperature equalization between the hot reactor cell and the heat sink, it is another feature of the invention to connect the pressure relief space in the inner containment containing the heat sink with the reactor cell by means of a number of large channels, and to close the channels with valves or blow-out discs that in case of break-down will open quickly and completely.

It is a further feature of the invention, that the heat sink within the inner containment is made of concrete and consists of several lamina fixed to a wall and preferably arranged vertically. It has become apparent that the use of concrete is especially favorable as to price, and space requirements, heat transfer factors, specific heat and ease of fabrication. The arrangement in form of lamina has shown itself to be advantageous in view of the small drop in pressure, although there are different arrangements where a better heat transfer can be expected.

According to a still further feature of the invention, the outer containment, that is, the intermediate shell, one of the three shells of the containment system, is provided with a gas-tight steel skin on its outer side. This outer containment contains not only the inner containment, but all installations that may hold radioactive media during reactor operation as well.

The advantages of the invention lie in that each of the three shells of the safety containment system can be built in an optimal fashion and with the highest degree of safety for substantially only one specific function, and that the requirements necessary for this can be fulfilled at an acceptable cost. In the following paragraphs, for each of the three shells of the safety containment system, its function is described in more detail and its advantages over the known safety containment systems are discussed.

The inner containment limits the immediate effects of a Bethe-Tait excursion, namely the increase of temperature and pressure due to the sodium being evaporated in the reactor cell. Since there are no pipes containing water or steam and the inner containment is made completely inert, there can be no additional increase in pressure and temperature due to a chemical reaction of the sodium. A large fraction of the heat liberated is taken up in the pressure relief space, the maximum possible pressure therefore remaining low. With regard to thermal stresses in concrete walls, the maximum temperature differential between the inside and the outside should not exceed 50° C. With regard to the chemical reaction of the sodium with the water contained in the concrete, the temperature of the wall should not exceed 120° C. This requirement can, however, be fulfilled by coating the endangered walls in the vicinity of the reactor with heat-resistant insulation substances. Under these circumstances, an extremely gas-tight construction of the inner containment can be dispensed with, which would also be very expensive in view of the numerous openings for the pipe system.

The outer containment has two essential functions, which need not be realized simultaneously, however. On the one hand the outer containment is to remain substantially gas-tight when a Bethe-Tait excursion occurs in the inner containment or when slight damage occurs to the auxiliary plant within the outer containment. This requirement can be fulfilled easily since there can be no high pressure or temperature loads and there are but few openings for pipes or gate locks. On the other hand, the outer containment furnishes protection against external accidents as, for example, an airplane crash. In this case it is an advantage that the outer containment together with the inner containment can be regarded as a single unit with regard to stability.

The third shell of the safety containment system, the reactor building, must only ensure a slightly negative pressure between the building and the outer containment, so that the air within the building can be monitored and fed to the exhaust stack through filters. Therefore the building can be designed to low requirements both as to statics and tightness.

Although the invention is illustrated and described herein as a containment system for sodium-cooled nuclear reactors, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
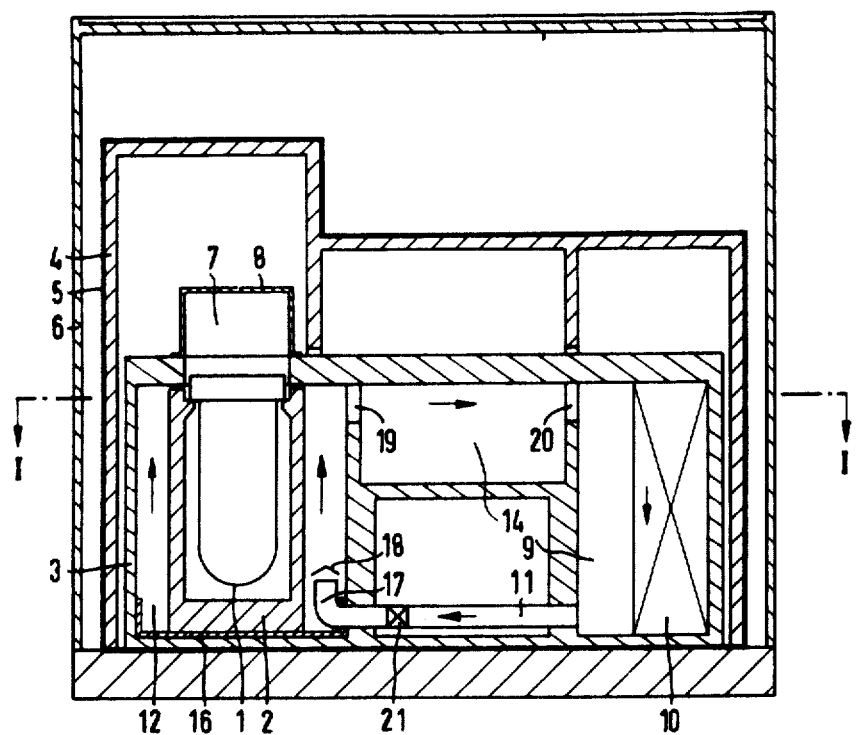
FIG. 1 depicts a vertical section through the three-shell safety containment system taken along line II—II in FIG. 2.
Figure 2:
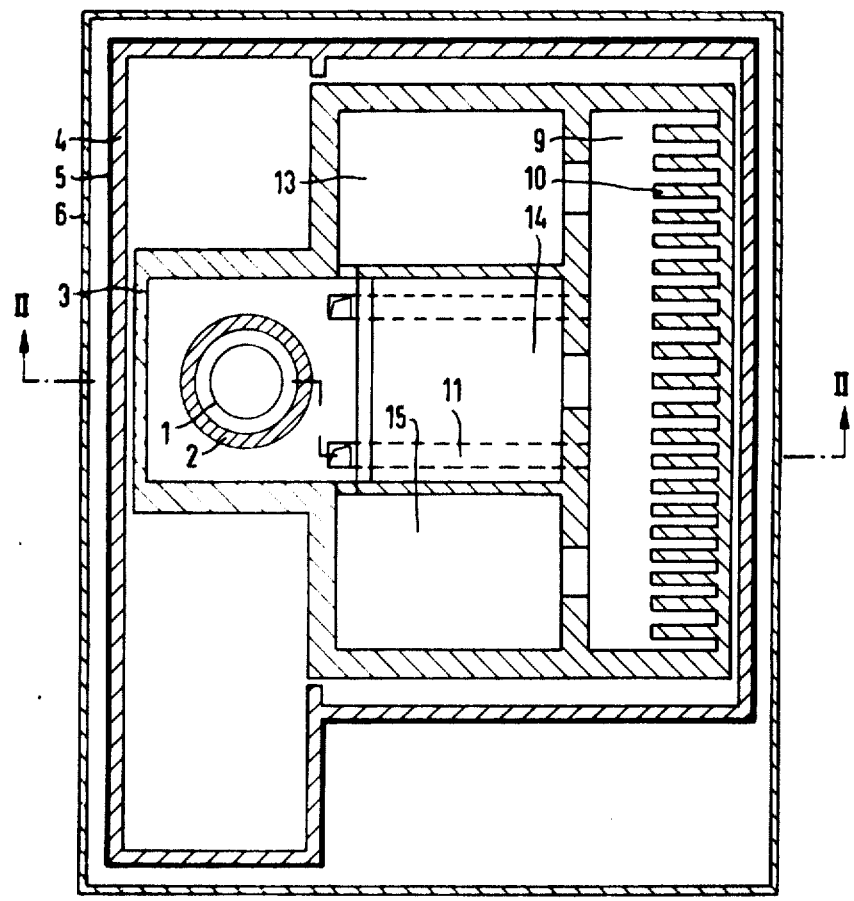
FIG. 2 depicts a horizontal section of the containment system taken along line I—I in FIG. 1.

FIG. 1 shows a steel reactor vessel 1 and concrete biological shield 2, a concrete wall 3 of the inner containment and also a concrete wall 4 of the outer containment, which is covered with a gas-tight steel skin 5. There are a concrete wall 6 of the reactor building, a reactor plug room 7 fixed to the inner containment and separated from the space of the outer containment by a skirt 8. There is also the so-called pressure relief space 9 in which there are numerous concrete lamina 10 fixed to the wall 4 of the inner containment. One of two channels 11 at the lower boundary of the inner containment is shown, connecting the pressure relief space 9 to the reactor cell 12. There are three primary cells 13, 14 and 15 in which the sodium pumps and intermediary heat exchangers are located. The steel cavity 16 in the reactor cell 12 serves to collect leaking sodium. The part 17 of the channel 11 is turned upwards and fitted with a cover 18 to prevent sodium from entering channel 11. There are openings 19 and 20 in the walls of the primary cells at the upper boundary of the inner containment. Reference numeral 21 designates a channel blocking means in the form of a valve or blow-out disc which opens the channel quickly and completely in response to changes in pressure and/or temperature occurring in the reactor cell 12 as a consequence of an accident in the reactor.

We claim:

1. Containment system for a sodium cooled reactor having a heat removal system for removing heat energy generated in the reactor during normal operation, wherein the containment system limits the effects of a Bethe-Tait excursion and heat energy released thereby and prevents the transmission of dangerous radiation to the environment in the event of an accident in the reactor, the containment system comprising three mutually telescoped containment shells of concrete surrounding the reactor, said shells being formed respectively of flat rectangular walls and a flat rectangular ceiling, a pressure relief compartment being disposed within the innermost of said shells, and a heat sink being located in said compartment and having a heat absorbing capacity adequate for absorbing the heat energy released by the reactor in the event of an accident therein as well as for absorbing the heat energy present during a simultaneous failure of the heat removal system, said innermost shell being resistant to pressure and being at least partially penetrable by gas.

2. The containment system of claim 1 wherein said innermost shell comprises a reactor cell for housing the reactor, said system comprising conduit means connecting said pressure relief compartment with said reactor cell.

3. The containment system of claim 2, wherein said conduit means is a plurality of channels.

4. The containment system of claim 3 wherein said system comprises conduit blocking means for blocking said channel conduits during normal operation of the reactor and for clearing said conduits in the event of an acicdent in the reactor.

5. The containment system of claim 4, wherein said blocking means is a plurality of valves mounted in said conduits, respectively.

6. The containment system of claim 4, wherein said blocking means is a plurality of blow-out discs, responsive to pressure changes in said reactor cell occasioned by the accident.

7. The containment system of claim 4, wherein a portion of said conduits are disposed in the upper region of said innermost shell and the remainder of said conduits are in the lower region of said innermost shell.

8. The containment system of claim 1, wherein said heat sink is made of concrete.

9. The containment system of claim 1, wherein said heat sink comprises a plurality of lamina fixed to a wall of said compartment.

10. The containment system of claim 1, wherein said system comprises sealing means on the intermediate containment shell of said three shells for sealing said outermost shell gas-tight.

11. The containment system of claim 10, wherein said sealing is a skin of sheet steel.

12. The containment system of claim 10, wherein said sealing means is a skin of plastic.

References Cited

UNITED STATES PATENTS 3,321,374  5/1967  Windle et al. _____ 176—38

CARL D. QUARFORTH, Primary Examiner

H. E. BEHREND, Assistant Examiner

U.S. Cl. X.R.

176—87